(No Model.)
J. McCARTHY PALMER.
LATHE TOOL.
No. 309,871. Patented Dec. 30, 1884.
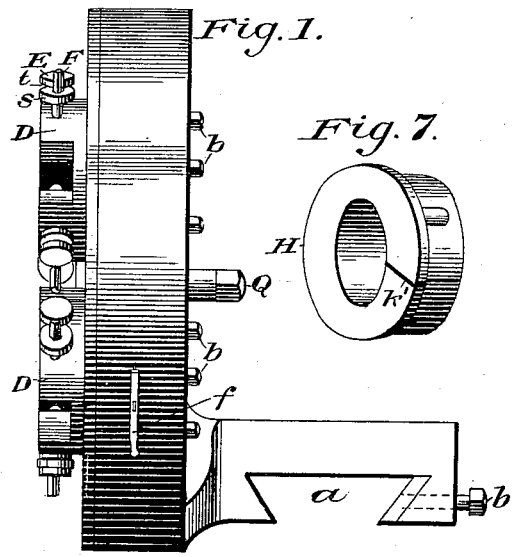
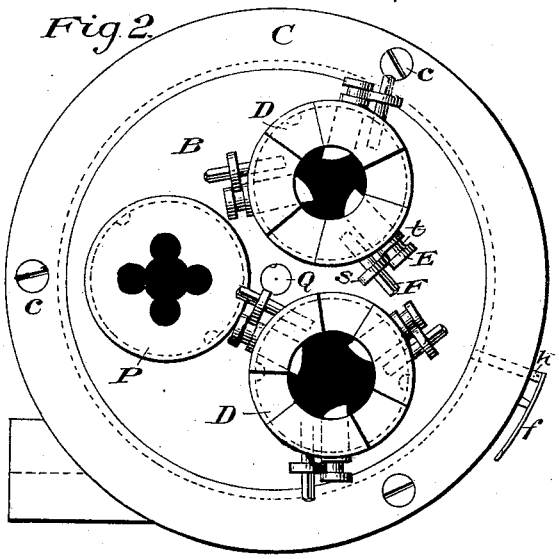
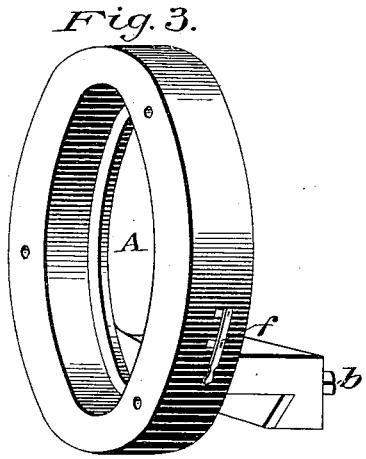
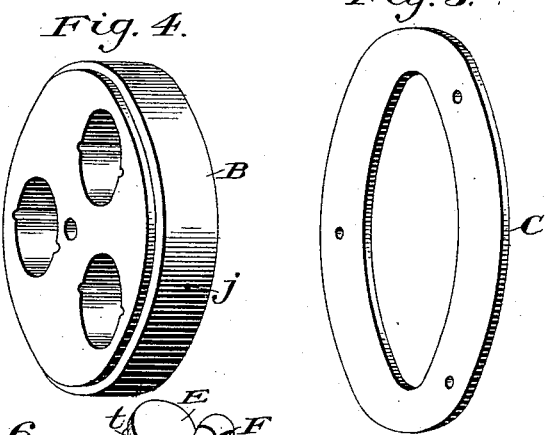
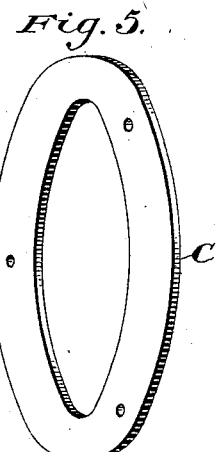
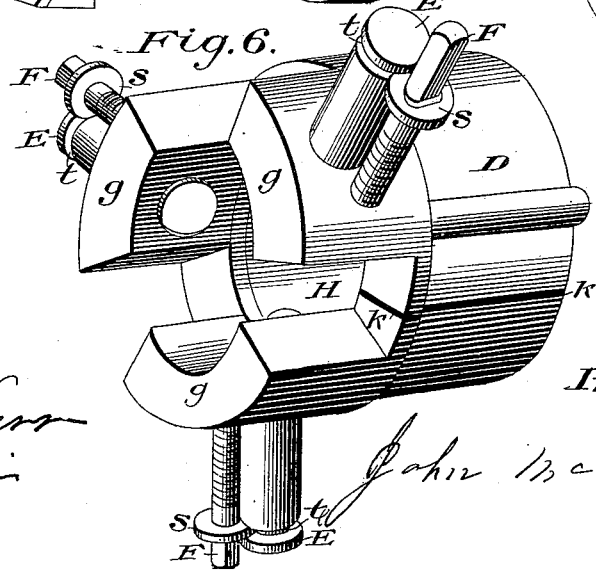
Witnesses:
Inventor:

UNITED STATES PATENT OFFICE.

JOHN M. PALMER, OF CHICAGO, ASSIGNOR OF ONE-HALF TO W. R. DENNIS, OF COOK COUNTY, ILLINOIS.

LATHE-TOOL.

SPECIFICATION forming part of Letters Patent No. 309,871, dated December 30, 1884.

Application filed March 6, 1884. (No model.)

*To all whom it may concern:*

Be it known that I, JOHN MCCARTHY PALMER, a citizen of the United States, residing in the city of Chicago, in the State of Illinois, have invented a new and useful Improvement in Cutting-Tools for Engine-Lathes, of which the following is a specification.

The object of my invention is to make a combination of cutting-tools which shall do the work more quickly and accurately than can be done by the tools now in use for turning shafting of all kinds and cutting long and short screws. I attain these objects by the mechanism illustrated in the accompanying drawings, in which—

Figure 1 is a front elevation of a complete tool ready to be applied to the feed-carriage of any engine lathe by the means of the dovetail groove $a$, which is made to fit the cross head of the feed-carriage by tightening the set-screw $b$, Figs. 1 and 3. Fig. 2 is an end elevation of Fig. 1.

A, Fig. 3, is a perspective view of the outside ring and standard of Fig. 1. B, Fig. 4, is the center and movable part, which is fitted in A, Fig. 3. C, Fig. 5, is a ring, which keeps B, Fig. 4, in its place in A, Fig. 3, being secured to A, Fig. 3, by the set-screws $c$ $c$ $c$. B, Fig. 4, revolves in A, Fig. 3, for the purpose of placing in line any of the sets of tools D which it is desired to use, and when placed is held in position by the lever $f$ and dog $h$, which drops into notches which are made in the edge of B, Fig. 4, at $j$.

Fig. 6 shows one set of cutting-tools complete and ready to be placed in position, as shown at D D, Fig. 2. It consists, first, of a cast-steel tube, D, of any desired size, in the outer end of which are cut or cast any number of grooves, which will leave a corresponding number of lugs, $g$ $g$ $g$. The hole in the tube D will be made large enough to receive a bushing, H, the hole in which will be of the exact size of the shaft to be turned, and should the operator be careless and set the cutters so that the shaft might stick fast to the bushing, I make provision to overcome the difficulty by having a narrow slot made in the bushing H and tube D, as shown at $k$ $k'$, Figs. 6 and 7, which intersects the holes.

In the lugs $g$ $g$ $g$ are placed the cutters E E E, which are made of any desired shape, each of which is raised or lowered by the set-screws F, on the heads of which are projecting flanges S, which fit tightly into the grooves $t$, which are made at the top of the cutters E E, which will admit of the slightest variation of the cut. The cutters E are secured additionally by the set-screws $b$ $b$ $b$, as shown at A, Fig 1.

When I want to cut a thread on the end of a shaft, I place in B, Fig. 2, a screw-cutting die, P.

B, Fig. 4, is revolved in A, Fig. 3, by applying a wrench to the hub $q$ $q$, Figs. 1 and 2.

I am aware that prior to my invention dies similar to P in Fig. 2 have been in use for cutting bolts. I therefore do not claim the die P; but What I do claim as my invention, and desire to secure by Letters Patent, is—

In an attachment to an engine-lathe, the combination of the slotted tubular cutter-holder D, slotted bushing H, cutters E E, adjusting-screws F F, and binding-screws $b$ $b$, substantially as shown, and for the purpose specified.

JOHN M. PALMER.

Witnesses:
W. R. DENNIS,
JOHN DENNIS.